US008234004B2

(12) United States Patent
Grissom

(10) Patent No.: US 8,234,004 B2
(45) Date of Patent: Jul. 31, 2012

(54) SYSTEMS AND METHODS FOR EFFICIENTLY DETERMINING ITEM SLOT ASSIGNMENTS

(75) Inventor: Charles Ray Grissom, Raleigh, NC (US)

(73) Assignee: Optricity Corporation, Chapel Hill, NC (US)

( * ) Notice: Subject to any disclaimer, the term of this patent is extended or adjusted under 35 U.S.C. 154(b) by 691 days.

(21) Appl. No.: 12/392,182

(22) Filed: Feb. 25, 2009

(65) Prior Publication Data

US 2009/0216364 A1 Aug. 27, 2009

Related U.S. Application Data

(60) Provisional application No. 61/031,776, filed on Feb. 27, 2008.

(51) Int. Cl.
*G06F 7/00* (2006.01)
(52) U.S. Cl. ........... 700/214; 705/28; 700/100; 235/385
(58) Field of Classification Search .................. 700/214, 700/215, 213
See application file for complete search history.

(56) References Cited

U.S. PATENT DOCUMENTS

| 6,711,449 | B1* | 3/2004 | Miyahara et al. ............. 700/100 |
| 7,941,244 | B2* | 5/2011 | Somin et al. .................. 700/216 |
| 2005/0192705 | A1* | 9/2005 | Pinney et al. ................. 700/241 |
| 2005/0284934 | A1* | 12/2005 | Ernesti et al. ................. 235/385 |
| 2007/0094101 | A1* | 4/2007 | Breitling ......................... 705/28 |
| 2010/0063621 | A1* | 3/2010 | Pelletier ....................... 700/214 |

* cited by examiner

*Primary Examiner* — Gene Crawford
*Assistant Examiner* — Kyle Logan
(74) *Attorney, Agent, or Firm* — Law Offices of Peter H. Priest, PLLC

(57) ABSTRACT

Techniques are described for assigning an item to a slot in an item storage facility, such as a warehouse or a distribution center. A plurality of scores are determined, each score associated with an item and slot pair, the slot chosen from a plurality of slots and each score representing a degree of conformity of the item to a desired sequence of item and slot pairs, wherein the degree of conformity is measured in a simulated pairing of the item with the slot chosen from the plurality of slots in a sequence of other item and slot pairs and a different slot is chosen from the plurality of slots for each simulated pairing with the item. The item is physically assigned to a best slot associated with a highest score among the plurality of scores.

13 Claims, 11 Drawing Sheets

SYSTEMS AND METHODS FOR EFFICIENTLY DETERMINING ITEM SLOT ASSIGNMENTS

FIELD OF THE DISCLOSURE

The present disclosure relates generally to the field of computerized placement and organization of items in a warehouse and more specifically for efficiently determining item slot assignments to improve the movement of items in a warehouse.

BACKGROUND

Many products, such as food related products, beauty and fashion items, home, hardware and repair supplies, automobile related products, electronic products, such as televisions, radios, cell phones, personal computers (PCs), games and packaged PC software, and the like, after manufacturing, are generally moved to a distribution center or warehouse. A distribution center controls the flow of the various products from receiving to storage to shipping. For example, products are received and moved to storage locations termed slots, selected products are then moved from their slots to placement in shipping containers to be sent to marketing endpoints, such as grocery stores, department stores, and the like. It can be appreciated that a haphazard method of storing products in a warehouse can lead to high costs due to inefficiencies in locating and moving the products. Further complicating the flow of products in a warehouse, is the varying demand for each product, such as experienced from an initial product introduction, through promotional and seasonal demands, to phase-out. A product's distribution cost is overhead that reduces profits and increases the price consumers must pay.

A physical warehouse is generally built with shelf racks in various configurations with each shelf containing labeled locations, called slots, for item storage. Slots in a warehouse may also be identified by marking locations on a floor, radio frequency identification (RFID) tags, barcodes, or otherwise. Operations performed in a warehouse include, for example, assigning items to slots, storing items from a receiving dock into assigned slots, and retrieving items from assigned slots to a transport dock. Warehouse slotting systems generally exist to guide users as to where to place items in a warehouse. Prior systems base this guidance on matching an item to a storage location slot with respect to dimensional data, weight capacity data, general location in the warehouse, such as designated areas for high, medium, and low volume items, or the like. The common feature in these prior systems is the item to slot matching is generally done by considering the single item and candidate slot. Also, prior systems generally captured data related to product movement within a warehouse, but did not typically provide means for improving product flow beyond a mere visualization of current operations.

SUMMARY

Among its several aspects, the present disclosure recognizes that providing a more efficient system and methods for determining item slot assignments can reduce product distribution costs. To such ends, an embodiment of the invention addresses a method for assigning an item to a slot in an item storage facility. A plurality of scores are determined, each score associated with an item and slot pair, the slot chosen from a plurality of slots and each score representing a degree of conformity of the item to a desired sequence of item and slot pairs, wherein the degree of conformity is measured in a simulated pairing of the item with the slot chosen from the plurality of slots in a sequence of other item and slot pairs and a different slot is chosen from the plurality of slots for each simulated pairing with the item. The item is physically assigned to a best slot associated with a highest score among the plurality of scores.

Another embodiment addresses a method for incrementally reorganizing a subset of items from a sequence of item and slot pairs contained in a warehouse. Item and slot pairs that score at or above a configurable threshold setting are identified, wherein the score represents a degree of conformity of an item and slot pair to a desired sequence of item and slot pairs. Items are removed from item and slot pairs that score below the configurable threshold to create a set of removed items and a set of empty slots. A score is determined for each removed item assigned in a simulation to one of the empty slots, the score representing a degree of conformity of the removed item and assigned empty slot pair to the desired sequence of item and slot pairs. Each of the removed items is physically assigned to a corresponding best slot having a highest score among the scores associated with each removed item.

Another embodiment addresses a method for determining when to reorganize items from a sequence of item and slot pairs contained in a warehouse. A score is calculated for each item and slot pair in the sequence of item and slot pairs with a computer, wherein each score represents a degree of conformity of an item and slot pair to a desired sequence of item and slot pairs. New scores are compared to previously calculated scores to determine whether any of the new scores are deteriorating. A reorganization of items from the sequence of item and slot pairs is triggered in response to deteriorating new scores.

Another embodiment addresses a computer readable medium having embodied thereon a program for assigning an item to a slot in an item storage facility, the program being executable by a computer. A plurality of scores are determined, each score associated with an item and slot pair, the slot chosen from a plurality of slots and each score representing a degree of conformity of the item to a desired sequence of item and slot pairs, wherein the degree of conformity is measured in a simulated pairing of the item with the slot chosen from the plurality of slots in a sequence of other item and slot pairs and a different slot is chosen from the plurality of slots for each simulated pairing with the item. The item is assigned to a best slot associated with a highest score among the plurality of scores.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
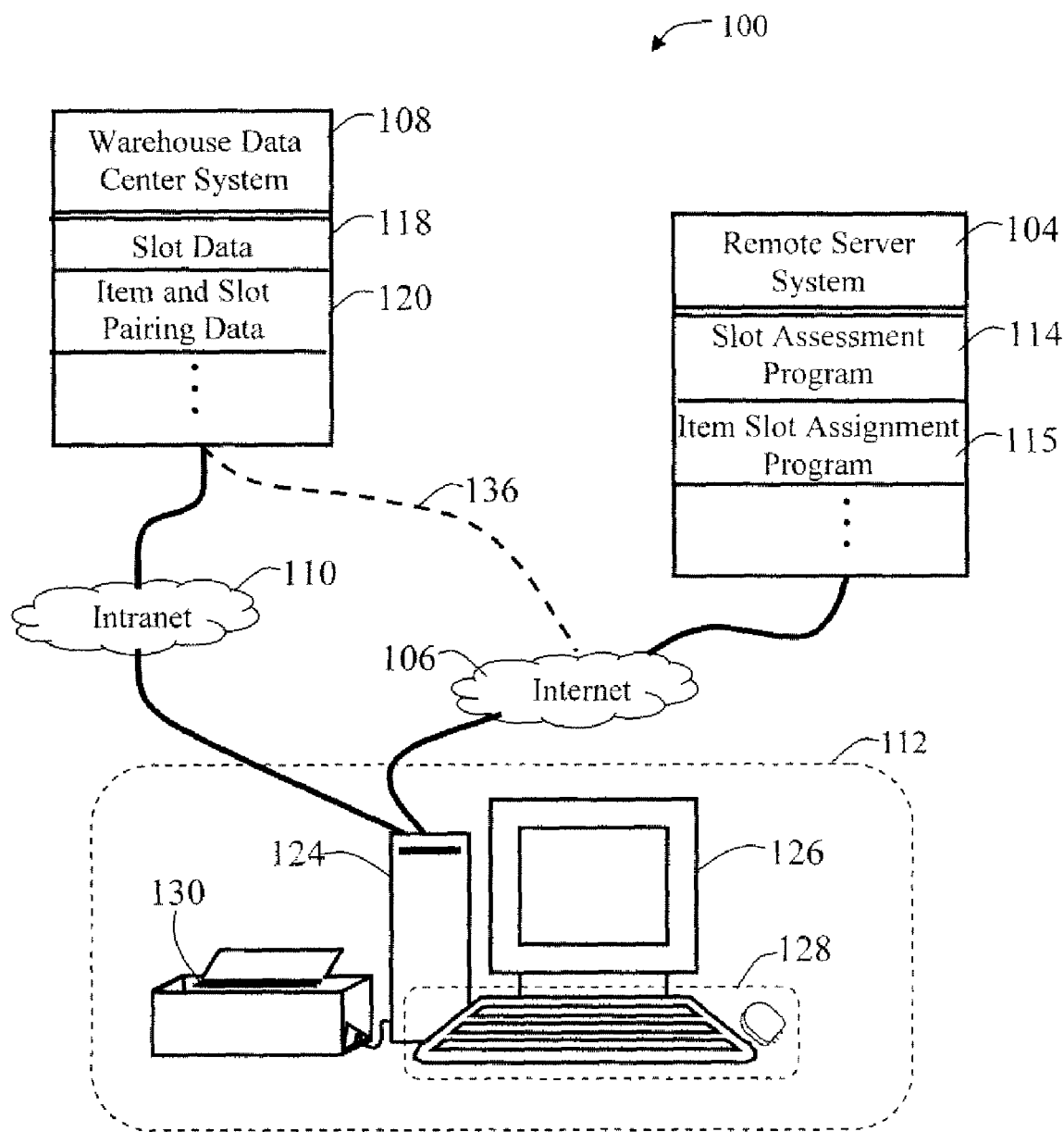
FIG. 1 illustrates a system for efficiently determining item slot assignments.

FIG. 1 illustrates a system 100 for efficiently determining item slot assignments in which an embodiment of the invention may be advantageously employed. The system 100 comprises a remote server system 104, the Internet 106, a warehouse data center system 108, an intranet 110, and a personal computer 112. The remote server system 104 stores, for example, a slot assessment program 114 and a item slot assignment program 115, both of which may be distributed to the personal computer 112 over the Internet 106. The warehouse data center system 108 stores warehouse information, such as slot data 118 and item and slot pairing data 120, which may be down loaded to the personal computer 112 over the intranet 110. The personal computer 112 comprises a central processing unit (CPU) and storage unit 124. Such personal computer 112 also includes interface connections to the Internet 106 and the intranet 110. The personal computer 112 also includes a display 126, a keyboard and mouse 128, and a printer 130. It is noted that in an alternative embodiment, the warehouse data center system 108 may be located remote from the physical warehouse and connected to the personal computer 112 through the Internet 106 utilizing an alternative path 136. While the personal computer 112 is shown as a desktop system, embodiments of the invention may be suitably employed in any device, such as a server, a laptop computer, or a personal data assistant, for example.

In a warehouse, multiple items are usually picked in a single task, perhaps to fill an order or set of orders, such as the orders to fill a truck, or for delivery to a particular store or group of stores, and the sequence of items to be picked down a path followed by a worker or machine can have a large influence on the productivity or efficiency of operations in the warehouse. For example, a common goal could be to have higher volume items, in terms of units shipped, assigned to slots located earlier in a travel path, so that orders are more likely to be picked with shorter total travel distance. Another common goal could be to have similar items separated by a specified distance, which would generally reduce picking errors. For example, a sports drink having many flavors that is packaged in similar looking cases except for a label may cause picking errors depending on placement. With many stacks of the sports drink that are placed in successive slots in a warehouse, it is very easy for a picker to pick a wrong flavor. By separating the various flavors at an appropriate distance, there is less chance of a picking error. Also, items that are often ordered together, such as washers and dryers, should be assigned in slots that are near each other to reduce the average dispersion for picking such orders. These criteria require consideration of nearby items when matching an item to a candidate slot. The processes described herein provide unique systems and methods for measuring multiple neighboring item criteria as part of a decision system for slotting items. The measurements provided by the process allow a user to determine overall conformity to item sequencing and item proximity goals. The measurements also provide guidance on finding a slot for a new item and determining whether degradation of slot conformity with desired goals has occurred over time as items are deleted from the warehouse and new items added. Among its many embodiments, such systems and methods take into account neighboring items to efficiently determine item slot assignments.

A product or item storage facility, such as a warehouse or distribution center, is usually organized in such a way that slots, or storage locations for items, are segmented into two or more categories. Two of these categories generally include slots that are used for item removal from the warehouse, herein called active pick slots, and slots that are used for general storage and/or for replenishing items into active pick slots, herein called reserve slots. The removal of items from the warehouse is usually accomplished by a person or machine visiting a number of active pick slots and retrieving items to be removed from those active pick slots, for example, to be shipped from the warehouse.

As items are received into a warehouse, stored, and subsequently removed or shipped from the warehouse, the "velocity" of an item can be measured. The velocity is a measure of "flow rate" of an item into and out of the warehouse. Examples of common velocity measures include, but are not limited to, items per time period, such as cases of items per week, item "hits" per time period which indicates the number of times an active pick slot for an item was visited per time period, "cube velocity" which indicates a number of physical volume units, such as, cubic feet, of an item per time period. Velocity is one attribute of an item used for determining a desired sequence of selecting items. For example, a desired sequence may be represented by an ordered list beginning with higher velocity items listed first followed by lower velocity items. A method of scoring conformity of an item-in-slot sequence to a preferred sequence, as described in more detail below, works with any desired sequence, where velocity sequencing is just a common one generally associated with improving productivity.

In order to direct a picking operation, active pick slots are further organized into "areas" or groups of slots, and those areas are placed into a pick sequence or pick path. A pick sequence is a partial ordering of the active pick slots. Thus, given any two active pick slots A and B, it is possible to determine whether A comes before B in the ordering, B comes before A, or A and B are equivalent in the ordering.

Given a set of items stored in active pick slots of a warehouse, the partial ordering of the active pick slots allows a partial ordering of the items to be derived. In particular, given a specific first item and a second item, the partial ordering on those two items is defined to be the partial ordering of the active pick slots that those items are assigned to. Given any two items stored in active pick slots, at least a sequence and a distance measure may be determined. For example, the sequence that may be determined is the sequence of the items visited, derived from the sequence of the slots visited. The distance measure is the physical distance between the items, measured either as the physical distance covered by a person or machine when moving between physical slot position in the warehouse or as the distance measured in slots, by means of the partial ordering of the slots addressed above.

For the purposes of operational efficiency of the warehouse, one embodiment specifies an item sequence, as defined by its corresponding partial ordering of the active pick slots, with respect to one or more desired sequences of items according to certain item attributes or criteria. Examples of such item sequences include, but are not limited to, items arranged according to decreasing item height, increasing item, height, decreasing item weight, increasing item weight, decreasing item velocity, increasing item velocity, and the like.

Figure 2:
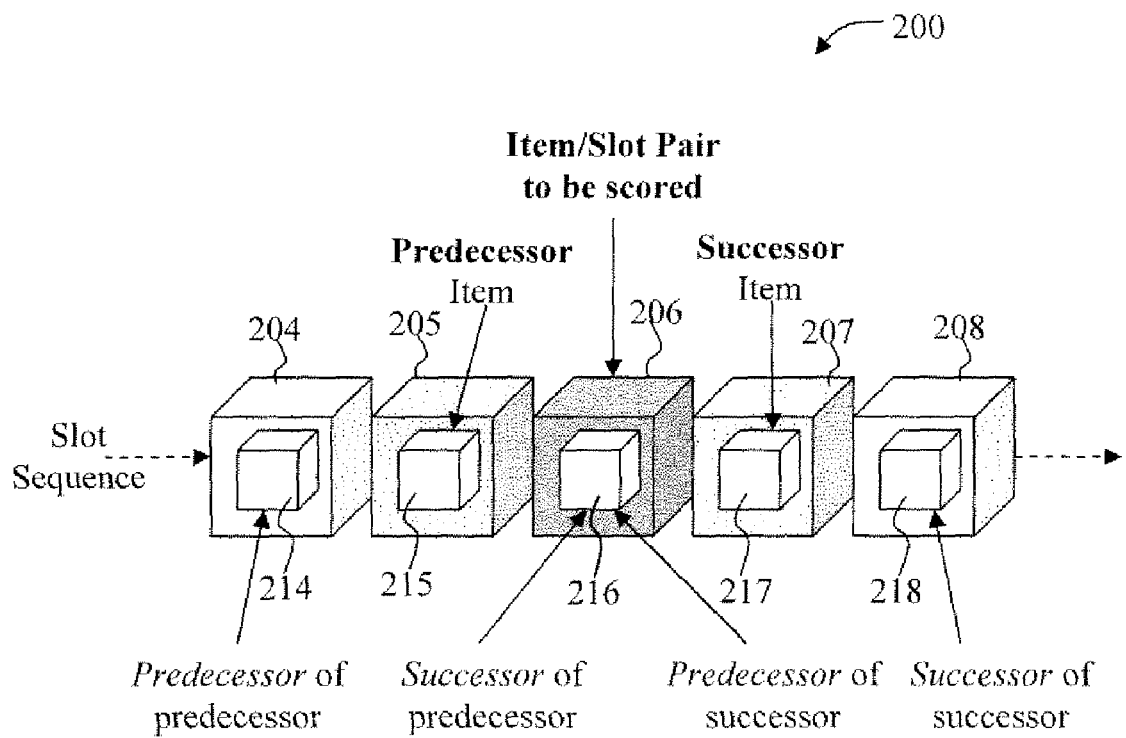
FIG. 2 illustrates an exemplary sequence of active pick slots with stored items.

FIG. 2 illustrates an exemplary preferred sequence 200 of active pick slots 204-208 with stored items 214-218, respectively. In the preferred sequence 200, an item 216 and slot 206 pair that is to be scored is identified. For the identified pair, the predecessor slot is slot 205 and the predecessor item is item 215. The successor slot is slot 207 and the successor item is item 217. It is noted that slot 206 is also a successor of predecessor slot 205 and slot 206 is a predecessor of successor slot 207.

To measure the conformity of an item-in-slot sequence to a preferred slot sequence, each item and slot assignment is measured by evaluating a selected predecessor item, which is an item from a previous non-empty slot in the slot sequence, with a selected successor item, which is an item from a successive non-empty slot in the slot sequence. This evaluation considers a triplet of items: the item being measured, such as item 216, a predecessor item, such as item 215, and a successor item, such as item 217. For this exemplary preferred sequence 200, four possible situations can be determined. For example, a first situation has item 215 and item 216 in order with respect to the preferred item sequence 200, but item 216 and item 217 are out of order. The score assigned to item 216 with respect to the assigned slot 206 is 0.5. A second situation has item 215 and item 216 out of order with respect to the preferred item sequence 200, but item 216 and item 217 are in order. The score assigned to item 216 with respect to the assigned slot 206 is 0.5. A third situation has item 215 and item 216 in order with respect to the preferred item sequence 200, and item 216 and item 217 are also in order. The score assigned to item 216 with respect to the assigned slot 206 is 1.0. A fourth situation has item 215 and item 216 out of order with respect to the preferred item sequence 200, but item 216 and item 217 are also out of order. The score assigned to item 216 with respect to the assigned slot 206 is 0.0.

Each item's slot assignment is thus assigned a score in the range of 0.0 to 1.0. One result of this assignment of scores is that the items are precisely in the desired sequence if and only if all items' slot assignments score exactly 1.0. In addition, the degree of conformity to the desired sequence can be directly read from the average score of all items' slot assignments. If this average score is 1.0, then the item sequence conforms to the desired sequence exactly. If this average score is near 0.5, then the items are essentially randomly ordered. If this average score is 0.0, then the items are in precisely the reverse of the desired sequence.

Data for embodiments of scoring processes, as described herein, using a system such as system 100 of FIG. 1, may be entered in spreadsheet files or through direct database access to the warehouse data center system 108. In addition, user interfaces, such as display 126 and keyboard and mouse 128, allows a user to manipulate an item and slot data, as well as change item to slot assignments, and configure desired sequencing and various constraints.

Figure 3A:
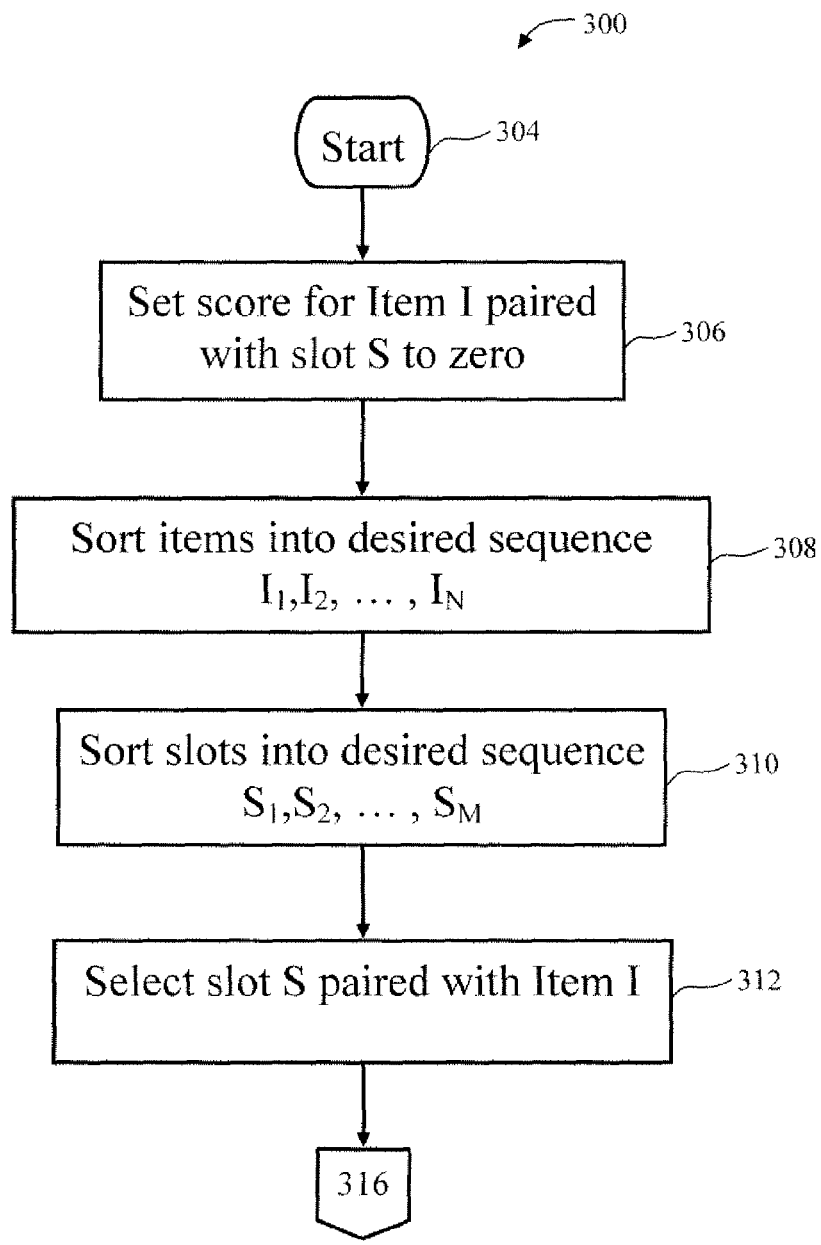
FIGS. 3A-3C illustrate a first scoring process to determine a score representing a measure of conformity of an item-in-slot sequence to a preferred slot sequence.
Figure 3B:
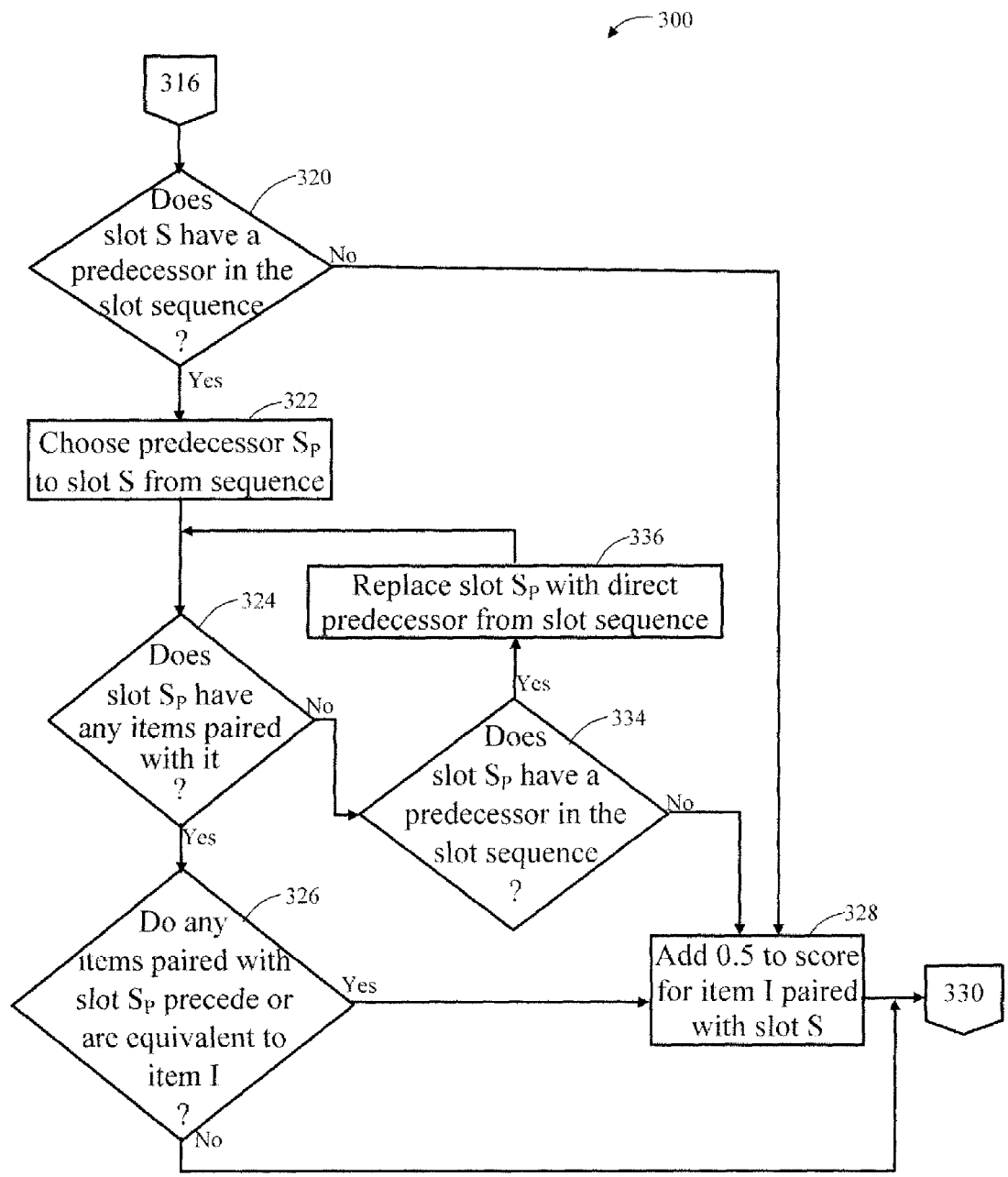
Figure 3C:
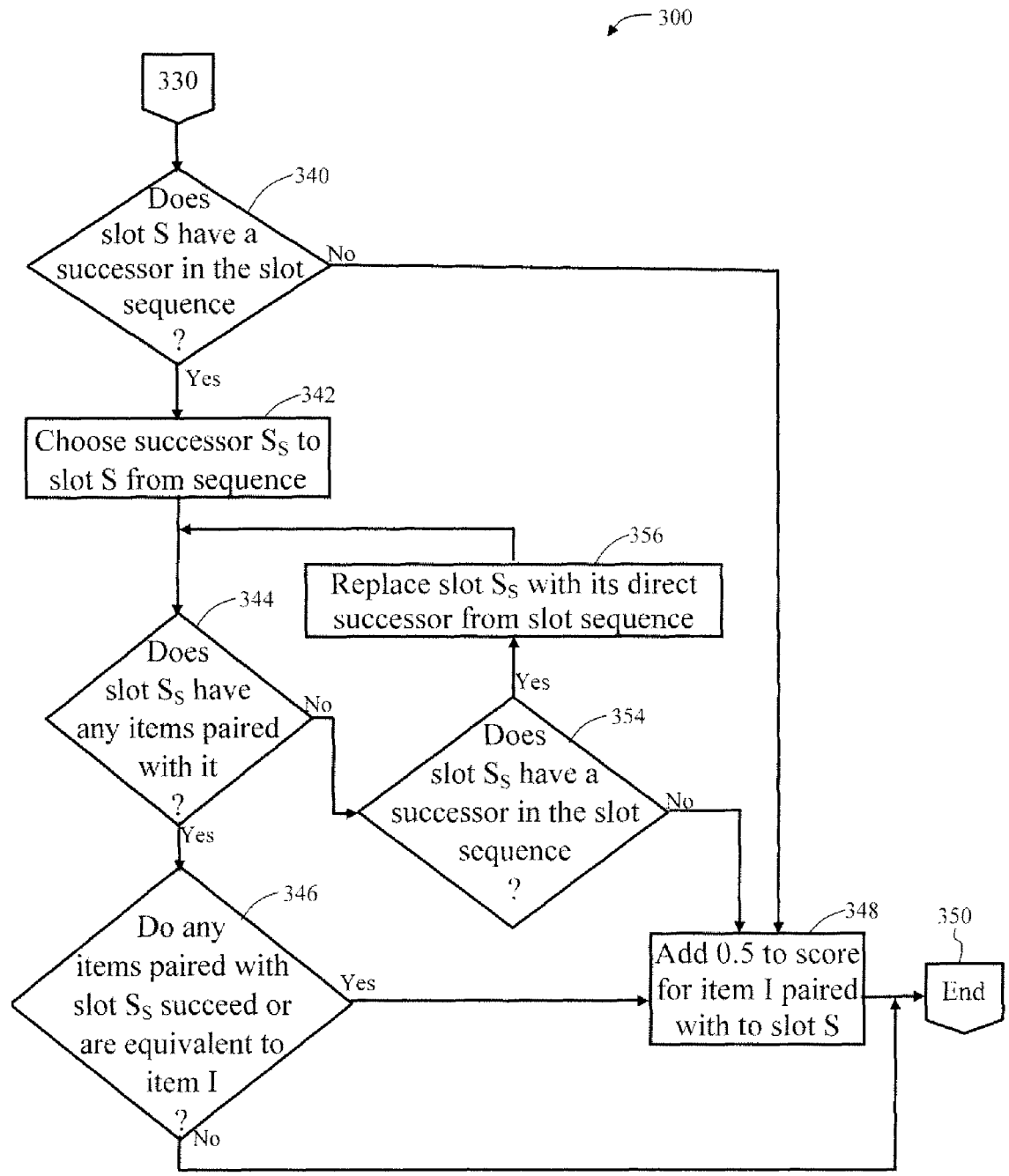

FIGS. 3A-3C illustrate a first scoring process 300 to determine a score representing a measure of conformity of an item in slot sequence to a preferred slot sequence. The first scoring process 300 starts at step 304 in FIG. 3A. At step 306, a score for an item I paired with a slot S is set to an initialization value, such as, zero. For example, item I paired with slot S may be interpreted as item I is physically stored in slot S and the score to be measured represents how well the item in slot conforms to a desired slot sequence. At step 308, N items are sorted into a desired item sequence, $I_1, I_2, \ldots, I_N$. At step 310, N slots are sorted into a desired slot sequence, $S_1, S_2, \ldots, S_M$, where M is greater than or equal to N. At step 312, the slot S paired with item I is selected.

The process proceeds to connecting point 316 in FIG. 3B. At decision step 320, a determination is made as to whether slot S has a predecessor in the slot sequence, $S_1, S_2, \ldots, S_M$. If there is a predecessor of slot S, the process 300 proceeds to step 322. At step 322, the predecessor slot is identified as slot $S_P$. At decision step 324, a determination is made as to whether the slot $S_P$ has any items paired with it. If slot $S_P$ has any items paired with it, the process 300 proceeds to decision step 326. At decision step 326, a determination is made whether any items paired with slot $S_P$ precede or are equivalent to item I. If there is an item that precedes or is equivalent to item I, the process proceeds to step 328. At step 328, a prespecified value, such as, 0.5 for scores ranging from 0 to 1, is added to the score for item I paired with slot S. It is realized that in other embodiments, scores may have different ranges, such as 1 to 10 and in such case a value of 5 could be prespecified to be added in step 328. The process 300 then proceeds to connecting point 330 in FIG. 3C. It is noted that multiple different items may occupy a slot, as determined at decision step 324, for example. The decision step 326 determines if there is a suitable item among the multiple different items in the slot.

Returning to decision step 326, if no items paired with slot $S_P$ precede or are equivalent to item I, the process 300 proceeds to connecting point 330. Returning to decision step 324, if slot $S_P$ does not have any items paired with it, the process 300 proceeds to decision step 334. At decision step 334, a determination is made as to whether slot $S_P$ has a predecessor in the slot sequence. If slot $S_P$ has a predecessor in the slot sequence, the process 300 proceeds to step 336. At step 336, the previously selected slot $S_P$ is replaced with its direct predecessor from the slot sequence. The process 300 then proceeds to decision step 324. Returning to decision step 334, if slot $S_P$ does not have a predecessor from the slot sequence, the process 300 proceeds to step 328. At step 328, 0.5 is added to the score for item I paired with slot S. The process 300 then proceeds to connecting point 330. Returning to decision step 320, if there is no such predecessor of slot S, the process 300 proceeds to step 328. At step 328, 0.5 is added to the score for item I paired with slot S. The process 300 then proceeds to connecting point 330.

The first scoring process 300 continues from the connecting point 330 in FIG. 3C. At decision step 340, a determination is made as to whether slot S has a successor in the slot sequence, $S_1, S_2, \ldots, S_M$. If there is a successor of slot S, the process 300 proceeds to step 342. At step 342, the successor slot is identified as slot $S_S$. At decision step 344, a determination is made as to whether slot $S_S$ has any items paired with it. If slot $S_S$ has any items paired with it, the process 300 proceeds to decision step 346. At decision step 346, a determination is made whether any items paired with slot $S_S$ succeed or are equivalent to item I. If there is an item that succeeds or is equivalent to item I, the process proceeds to step 348. At step 348, 0.5 is added to the score for item I paired with slot S. The process 300 then proceeds to end point 350.

Returning to decision step 346, if no items paired with slot $S_S$ succeed or are equivalent to item I, the process 300 proceeds to end point 350. Returning to decision step 344, if slot $S_S$ does not have any items paired with it, the process 300 proceeds to decision step 354. At decision step 354, a determination is made as to whether slot $S_S$ has a successor in the slot sequence. If slot $S_S$ has a successor in the slot sequence, the process 300 proceeds to step 356. At step 356, the previously selected slot $S_S$ is replaced with its direct successor from the slot sequence. The process 300 then proceeds to decision step 344. Returning to decision step 354, if slot $S_S$ does not have a successor from the slot sequence, the process 300 proceeds to step 348. At step 348, 0.5 is added to the score for item F paired with slot S. The process 300 then proceeds to end point 350. Returning to decision step 340, if there is no such successor of slot S, the process 300 proceeds to step 348. At step 348, 0.5 is added to the score for item I paired with slot S. The process 300 then proceeds to end point 350.

Figure 4A:
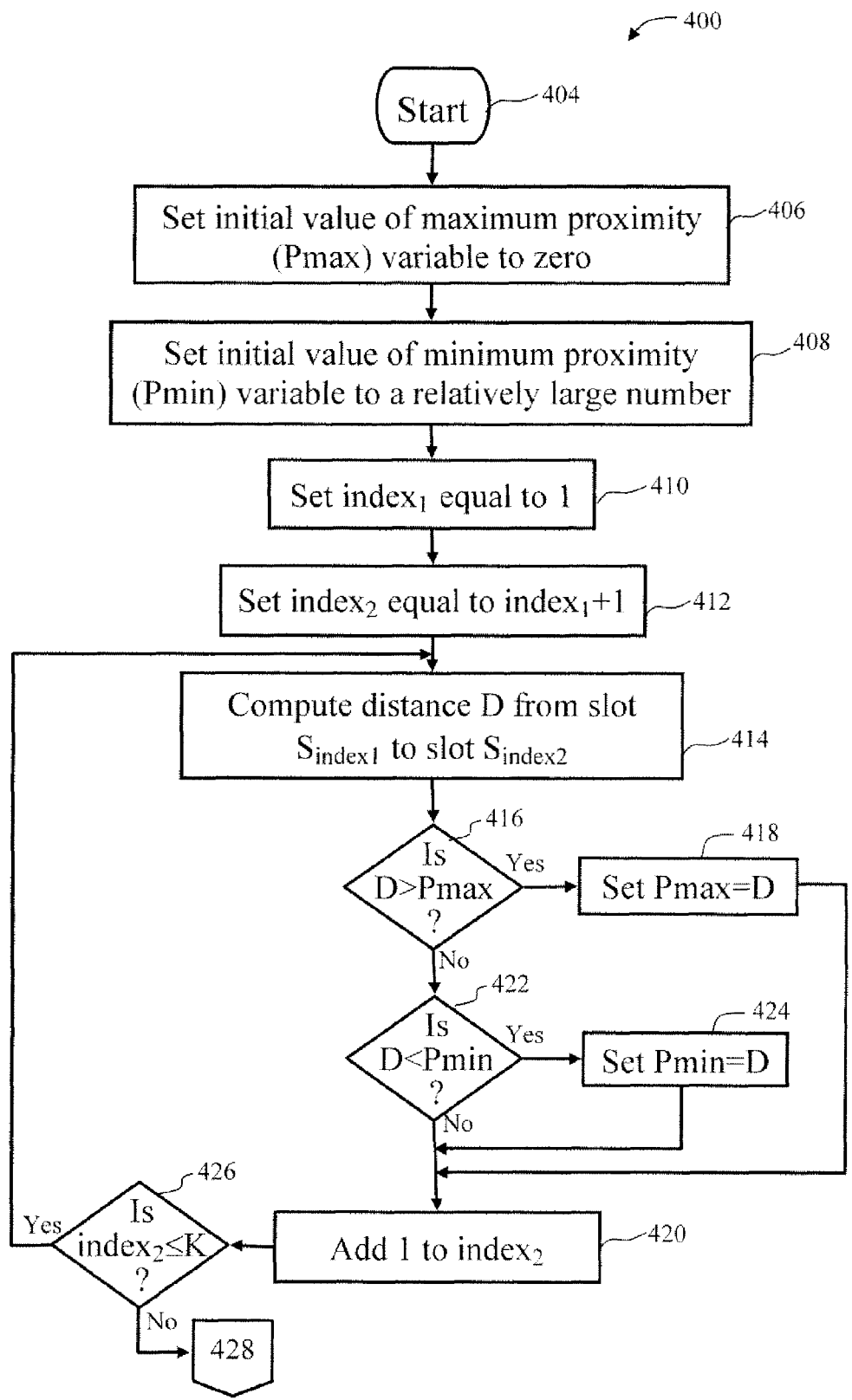
FIGS. 4A and 4B illustrate a second scoring process to measure conformity of a specified group of items to a specified proximity distance between any two items in the group.
Figure 4B:
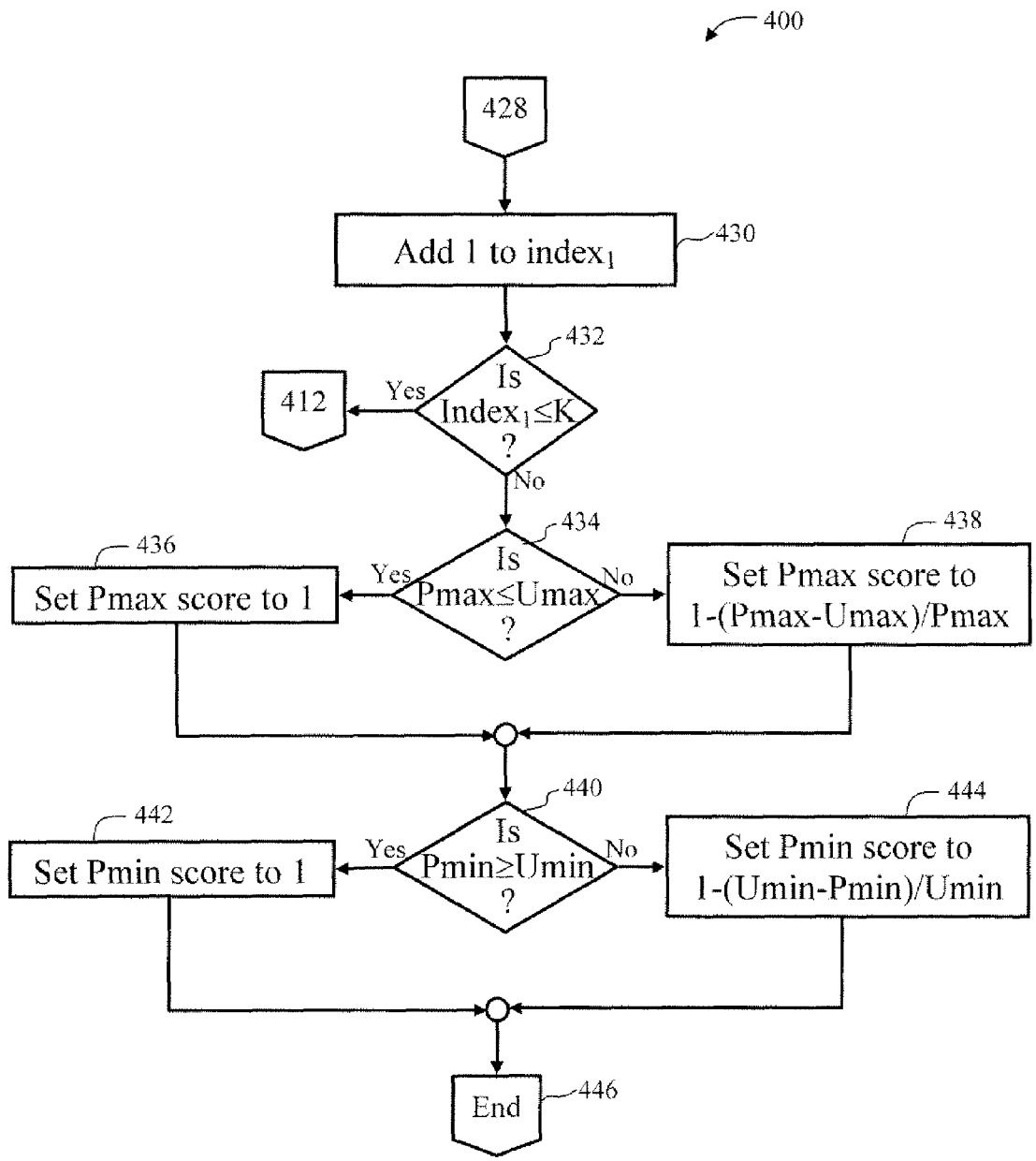

FIGS. 4A and 4B illustrate a second scoring process 400 to measure conformity of a specified group of items to a specified proximity distance between any two items in the group. The specified group is generally a subset of the entire collection of items. A first rule may be applied to determine whether all items in a group are within some specified maximum distance of one another. Also, a second rule may be used separately or in addition to the first rule to determine whether all items in the group are separated by some specified minimum distance. The separation distance is a measure of proximity of one item to another item. In order to determine whether an item to slot assignment affects the group proximity, the maximum and minimum pair wise distances for all members of the specified group are calculated, not just for the item being assigned.

The second scoring process 400 computes a maximum and a minimum proximity score on a scale from zero to one for a group of items, and by definition any item in the group, in an ordered sequence $I_1, I_2, \ldots, I_K$, K being 2 or more, associated to corresponding slots $S_1, S_2, \ldots, S_K$. The variables Pmax and Pmin are computed first with respect to a user specified maximum proximity (Umax) and second with respect to a user specified minimum proximity (Umin). The second scoring process 400 starts at step 404 in FIG. 4A. At step 406, an initial value of a maximum proximity (Pmax) variable is set to zero. At step 408, an initial value of a minimum proximity (Pmin) variable is set to a relatively large number as compared to anticipated measured distances. At step 410, a first index ($index_1$) is set equal to one. At step 412, a second index ($index_2$) is set equal to $index_1+1$. At step 414, a distance D from slot $S_{index1}$ to slot $S_{index2}$ is computed. At decision step 416, a determination is made whether D is greater than Pmax. If D is greater than Pmax, the process 400 proceeds to step 418. At step 418, Pmax is set equal to D. If D is not greater than Pmax, then the process proceeds to decision step 422. At decision step 422, a determination is made whether D is less than Pmin. If D is less than Pmin, the process 400 proceeds to step 424. At step 424, Pmin is set equal to D. It is noted that cases where D is equal to Pmax or the case where D is equal to Pmin are specifically ignored since following steps 418 and 424 would not be necessary. At step 420, one is added to $index_2$. At decision step 426, a determination is made whether $index_2$ is less than or equal to the number of items K. If $index_2$ is less than or equal to the number of items K, the process 400 proceeds to step 414. If $index_2$ is greater than the number of items K, the process 400 proceeds to connecting point 428.

The second scoring process 400 continues from the connecting point 428 in FIG. 4B. At step 430, a one is added to $index_1$. At decision step 432, a determination is made whether $index_1$ is less than or equal to K. If $index_1$ is less than or equal to K, the process 400 returns to step 412. If $index_1$ is greater than K, the process 400 proceeds to decision step 434. At decision step 434, a determination is made whether Pmax is less than or equal to the user specified maximum value (Umax). If Pmax is less than or equal to Umax, the process 400 proceeds to step 436. At step 436, Pmax is set to a one indicating the separation of items is less than or equal to the desired maximum proximity. If Pmax is greater than Umax, the process 400 proceeds to step 438. At step 438, Pmax is set to 1−(Pmax−Umax)/Pmax. For very large values of Pmax, the calculation of 1−(Pmax−Umax)/Pmax yields a number close to zero, representing a poor achievement of the rule to stay within the desired maximum proximity $U_{max}$.

At decision step 440, a determination is made whether Pmin is greater than or equal to the user specified minimum value (Umin). If Pmin is greater than or equal to Umin, the process 400 proceeds to step 442. At step 442, Pmin is set to a one. The process 400 then proceeds to end point 446. If Pmin is less than Umin, the process 400 proceeds to step 444. At step 444, Pmin is set to 1−(Umin−Pmin)/Umin. The process 400 then proceeds to end point 446.

At the end point 446, the generated score represents conformity of the group of items, and by definition any item in the group, to the specified proximity requirement, such that a score of one indicates perfect conformity and a zero represents a lack of conformity to the desired rule. It is noted that scores for alternative placements of items into different slots may be ranked to find a placement that minimizes a failure to meet the desired proximity, if no slot meets the desired proximity maximum and minimum goals. It is further noted that while process 400 illustrates a rule that specifies both a maximum and a minimum pair wise proximity, an alternative rule may be specified for either a maximum pair wise proximity or for a minimum pair wise proximity.

For example, suppose there is a group of three items, I1, I2, I3 and items I1 and I2 are already paired with slots S1 and S2, respectively. Item I3 is currently not in a slot. To determine the impact of pairing I3 with slot S3 and the score for the group, a score, that is assigned to each of the item and slot pairs I1/S1. I2/S2, and I3/S3, is calculated. For this calculation, the distances between I3 and I1 and between I3 and I2 are not sufficient, and the distance between I1 and I2, which is the distance between the slots S1 and S2, should also be determined in order to find the impact of including I3/S3. In particular with a maximum separation rule of 10 feet, and if I1 and I2 are 11 feet apart, the score according to process 400 for each of the pairs I1/S1 and I2/S2, and thus for the group itself, is 1−(11−10)/11=0.909. Now several things may be considered, depending on the location of the item I3/S3 pair. In one scenario, if I3 is, for example, 8 feet from I1 and 9 feet from I2, then the score is unchanged, since the 11 foot distance between I1 and I2 is the determining factor. However, in a different scenario, if I3 is 12 feet from I1 and 9 feet from I2, then the score is changed to 1−(12−10)/12=0.833. In both scenarios it was important to know the distance between I1 and I2. The score is used in the first scenario to indicate that the placement of item I3 into slot S3 does not degrade the group score and in fact cannot improve it. In the second scenario, the placement of item I3 into slot S3 is a poor choice because it does degrade that score.

By computing a score of conformity to one or more goals, the score that is generated provides users an indication of how well the goals are being met. For example, with regard to a goal of meeting a specific separation distance, a score of 1.0 indicates the goal has been achieved or is achievable. A score of 0.85 indicates nearly achieving the goal, a score of 0.5 indicates a poor achievement, and a score of 0 indicates the goal is not achieved. Rather than providing a simple binary yes or no decision regarding whether an item can be placed in a slot, the unique scores, such as provided by process 300 and 400 or by weighting the scores from both processes, provide unique information that drives decisions. For example, there may be no way to fully enforce a minimum distance between an identified group of nearly-like items while also placing the items in a strict sequence with respect to a velocity criteria. In such a scenario, having a composite score and individual scores, such as generated by process 300 and process 400, for example, allow quick tradeoff decisions to be made.

Figure 5:
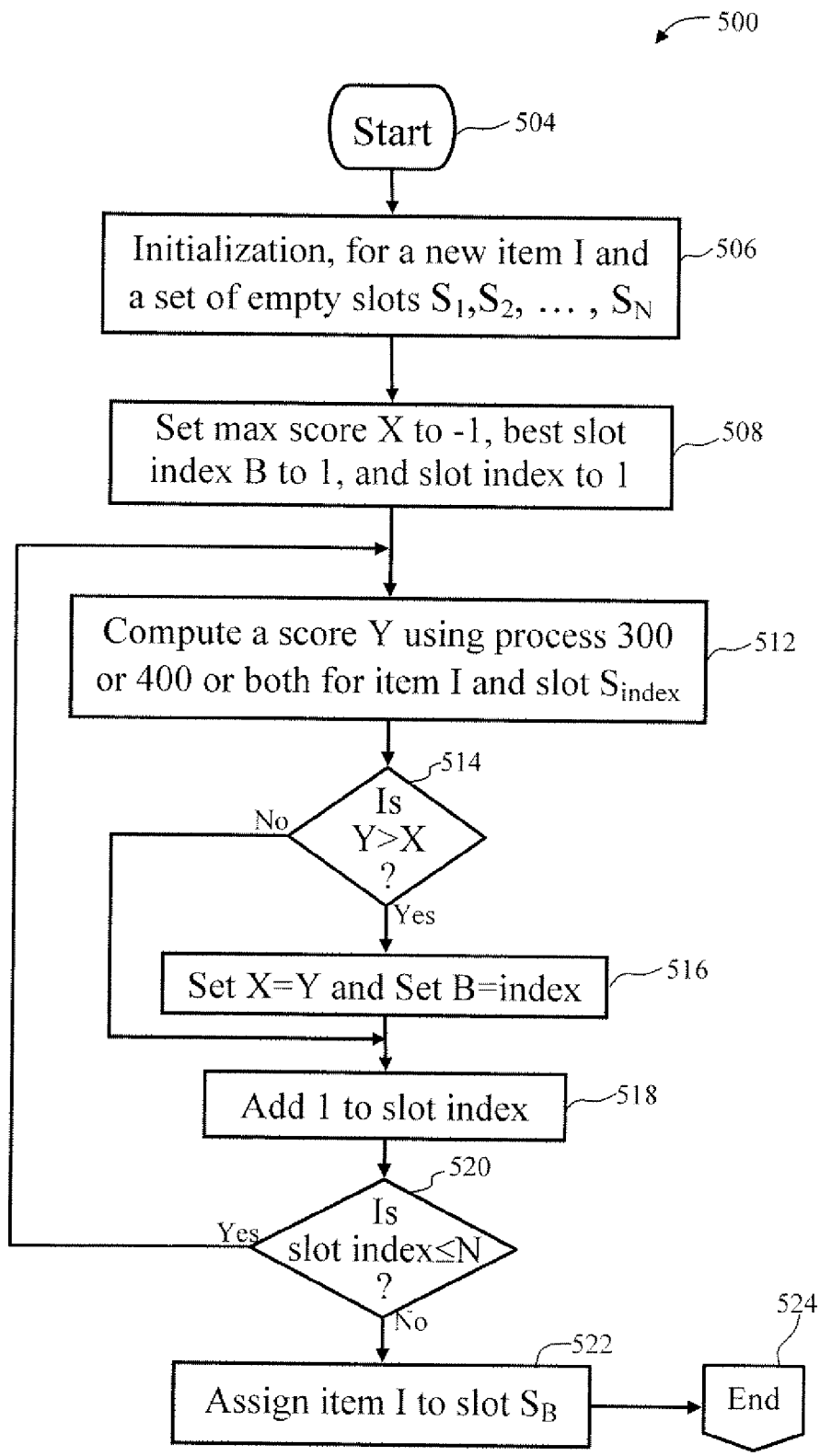
FIG. 5 illustrates a first item slot assignment process for finding a best slot to place a new item from among a set of empty slots.

FIG. 5 illustrates a first item slot assignment process 500 for finding a best slot to place a new item from among a set of empty slots. In the case of a generally full warehouse with randomly distributed empty slots, it is difficult, in most cases, to determine which one of the randomly distributed empty slots would be the best slot for placement of a new item. The first item slot assignment process 500 finds a best slot for assigning a new item using either the first scoring process 300 shown in FIGS. 3A-3C or the second scoring process 400 shown in FIGS. 4A and 4B or a combination of both scoring processes. For example, item and slot pairs may be scored with respect to one or more desired item sequences using the first scoring process 300. The item and slot pairs may also be scored with respect to one or more item proximity groupings using the second scoring process 400. The results of the two processes 300 and 400 may also be combined using a weighted average of the individual scores to produce a single composite score for each item and slot pair on a scale from 0 to 1.

The first item slot assignment process 500 begins at step 504 in FIG. 5. At step 506, the process 500 is initialized for a new item I and a set of empty slots $S_1, S_2, \ldots, S_M$. At step 508, a maximum score X is set to −1, a best slot index B is set to 1, and a slot index is set to 1. At step 512, a score Y is computed for the new item I and for the empty slot identified by the slot index, $S_{index}$. The score Y is computed using, for example, process 300 of FIGS. 3A-3C and or process 400 of FIGS. 4A and 4B to generate a score Y. Both processes 300 and 400 may be used to generate a composite score Y by weighting results of both processes 300 and 400. It is noted that a particular warehouse may weigh the results of processes 300 and 400 differently depending on the relative importance of the sequences or group proximity requirements being measured. It is generally difficult to meet more than one such rule at a time, so they may be weighted according to a specified priority of the rules. For example, one rule may specify a minimum separation distance between all items in a group and a second rule may specify that the overall set of items be placed in a preferred sequence. In this example, the first rule may be applied with a higher weight than the second rule. Additionally, it is noted that the process 300 allows for the measurement of scores with respect to several desired but possibly incompatible sequences by applying process 300 for each desired sequence and measuring a separate score for each desired sequence. Likewise, process 400 may be applied for several different group proximity rules. Finally, a weight comprising a positive numeric factor may be assigned to each of the individual scores obtained by the multiple applications of processes 300 and 400 to obtain a weighted average composite score.

At decision step 514, a determination is made whether the score Y is greater than X. If the score Y is greater than X, the process 500 proceeds to step 516. If the score Y is less than or equal to X, the process 500 branches around step 516 and proceeds to step 518. At step 516, score Y is set equal to X and the best slot index B is set equal to the present value of the slot index. At step 518, a one is added to the slot index. At decision step 520, a determination is made whether the slot index is less than or equal to the number of empty slots N. If the slot index is less than or equal to N, the process 500 returns to step 512. If the slot index is greater than N, the process 500 proceeds to step 522. At step 522, the new item I is assigned to slot B, $S_B$. At step 524, the process 500 ends.

Figure 6:
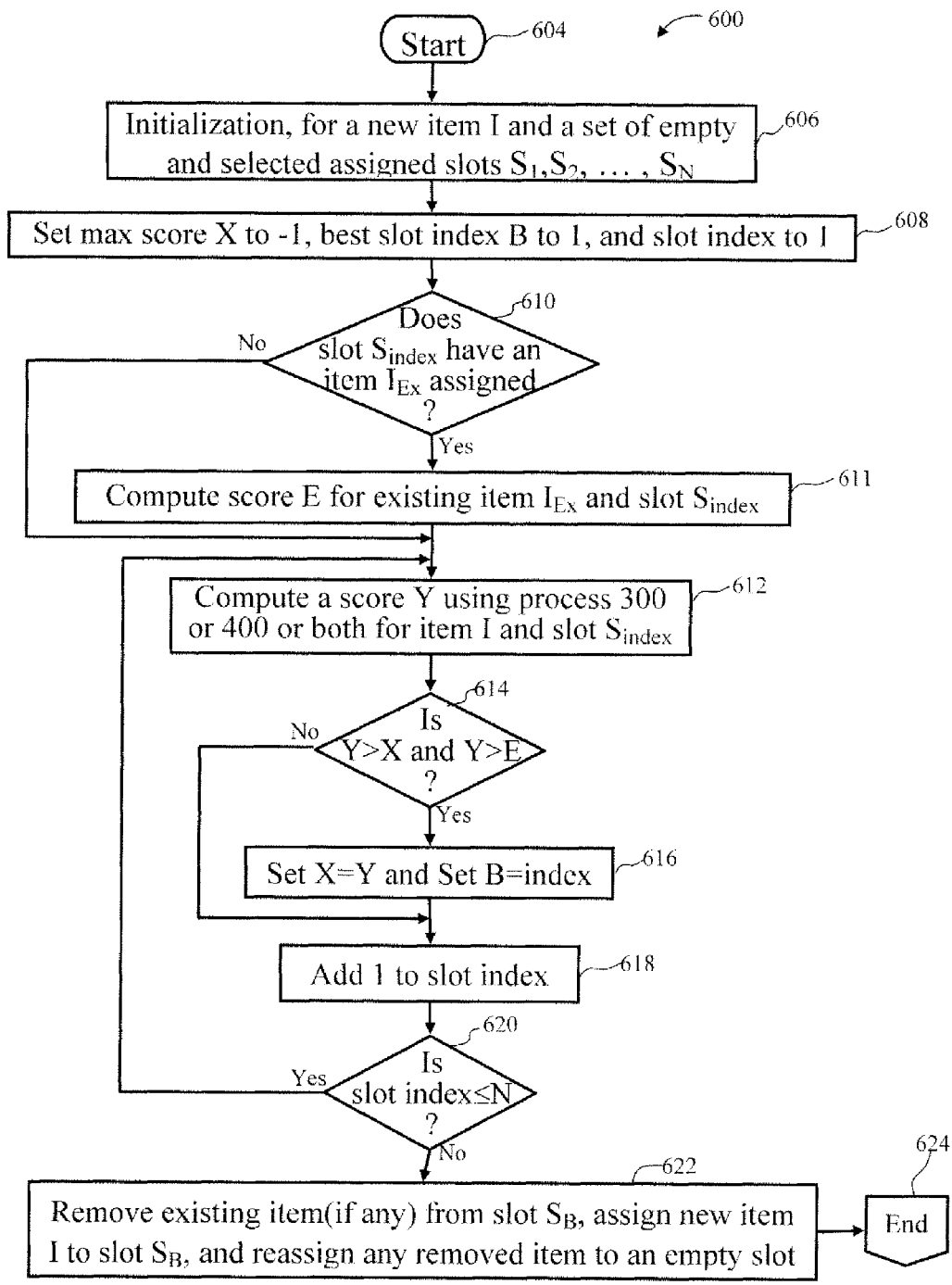
FIG. 6 illustrates a second item slot assignment process for finding a best slot to place a new item from among a set of slots which may include empty slots and slots already occupied by existing items.

FIG. 6 illustrates a second item slot assignment process 600 for finding a best slot to place a new item from among a set of slots which may include empty slots and slots already occupied by existing items. In the case of a generally full warehouse with randomly distributed empty slots and a set of poorly scoring items in occupied slots, it is difficult, in most cases, to determine which of the randomly distributed empty slots and poorly scoring items occupying existing slots would be the best slot for placement of a new item. If a poorly scoring item in an existing slot is selected as the best slot for placement of the new item, the poorly scoring item is moved to one of the randomly distributed empty slots using, for example, the first item placement process 500 of FIG. 5.

The second item slot assignment process 600 finds a best slot for assigning a new item using either the first scoring process 300 shown in FIGS. 3A-3C or the second scoring process 400 shown in FIGS. 4A and 4B or a combination of both scoring processes. For example, item and slot pairs may be scored with respect to one or more desired item sequences using the first scoring process 300. The item and slot pairs may also be scored with respect to one or more item proximity groupings using the second scoring process 400. The results of the two processes 300 and 400 may also be combined using a weighted average of the individual scores to produce a single composite score for each item and slot pair on a scale from 0 to 1.

The second item slot assignment process 600 begins at step 604 in FIG. 6. At step 606, the process 600 is initialized for a new item I and a set of empty and selected assigned slots $S_1, S_2, \ldots, S_N$. One or more already occupied slots may be selected dependent upon their previously measured score. At step 608, a maximum score X is set to −1, a best slot index B is set to 1, and a slot index is set to 1. At decision step 610, a determination is made whether slot $S_{index}$ has an item $I_{Ex}$ assigned to it. If slot $S_{index}$ has an item $I_{Ex}$ assigned to it, the process 600 proceeds to step 611. If slot $s_{index}$ does not have an item $I_{Ex}$ assigned to it, the process 600 branches around step 611 and proceeds to step 612. At step 611, a score E for existing item $I_{Ex}$ and slot $S_{index}$ is computed. At step 612, a score Y is computed for the new item I and for the slot identified by the slot index, $S_{index}$. The score Y is computed using, for example, both processes 300 of FIGS. 3A-3C and 400 of FIGS. 4A and 4B to generate a composite score Y by weighting results of both processes 300 and 400 equally. It is noted that a particular warehouse may weight the results of processes 300 and 400 differently as addressed above.

At decision step 614, a determination is made whether the score Y is greater than X and score Y is greater than E. If the score Y is greater than X and score Y is greater than E, the process 600 proceeds to step 616. If the score Y is less than or equal to X or if the score Y is less than or equal to E, the process 600 branches around step 616 and proceeds to step 618. At step 616, score Y is set equal to X and the best slot index B is set equal to the present value of the slot index. At step 618, a one is added to the slot index. At decision step 620, a determination is made whether the slot index is less than or equal to the number of empty slots N. If the slot index is less than or equal to N, the process 600 returns to step 612. If the slot index is greater than N, the process 600 proceeds to step 622. At step 522, if there is an existing item in slot $S_B$ it is removed, the new item I is assign to slot $S_B$, and any removed item is assigned to an empty slot according to process 500 of FIG. 5.

Figure 7A:
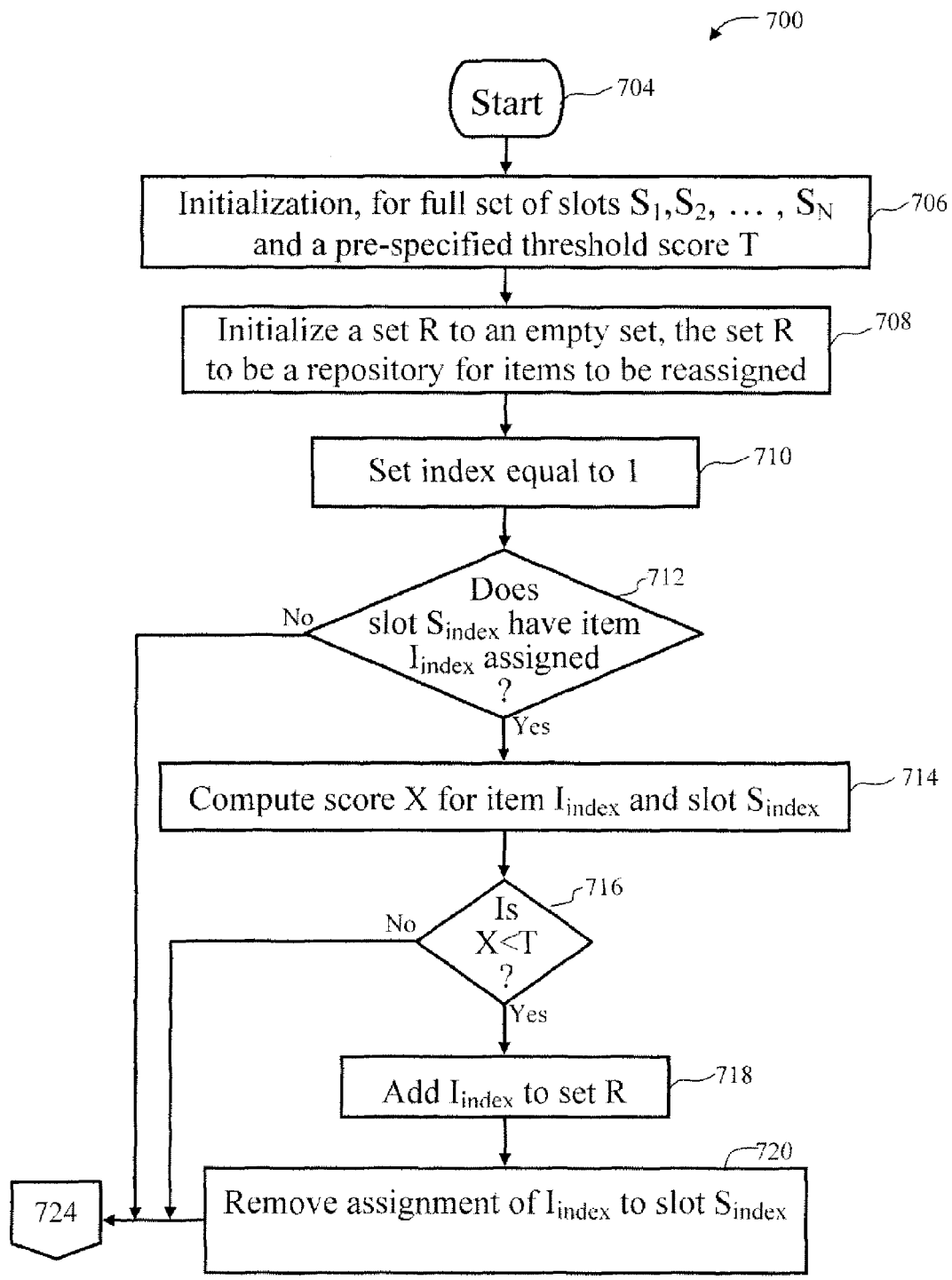
FIGS. 7A and 7B illustrate an incremental reslotting process for reassigning items from existing slots to new slots to improve conformity scores.
Figure 7B:
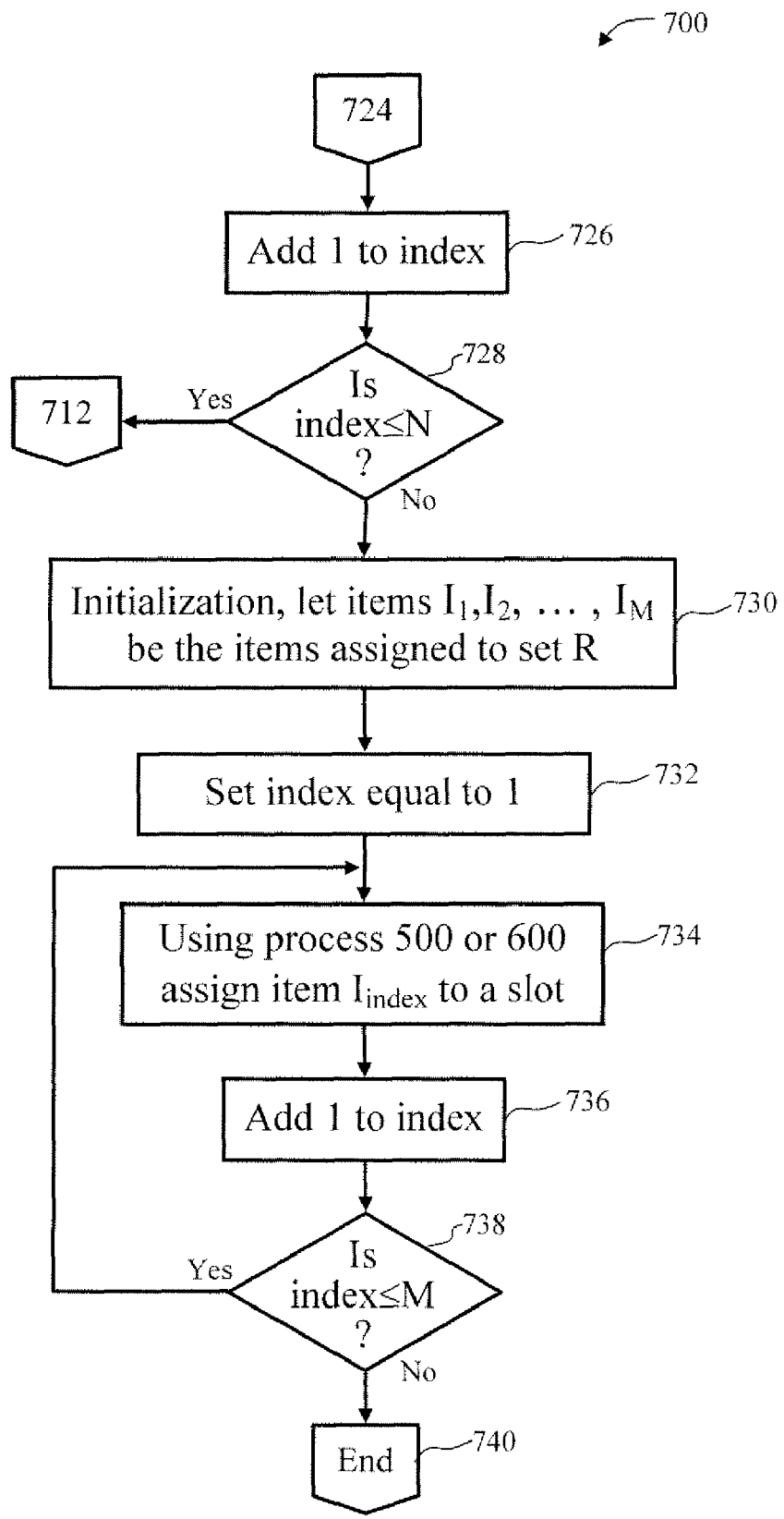

FIGS. 7A and 7B illustrates an incremental reslotting process 700 for reassigning items from existing slots to new slots to improve conformity scores. Generally, it is cost prohibitive to reassign a large number of items to new slots at any one time. The incremental reslotting process 700 first identifies all item and slot pairings that score highly, as determined by a configurable threshold setting, and locks those item and slot pairings as they are. The remaining item and slot pairs are then removed and reassigned by, for example, use of the first item slot assignment process 500 of FIG. 5. The use of the first item slot assignment process 500 generally produces a higher score for each of the remaining item and slot pairs. Thus the incremental reslotting process 700 identifies a more manageable number of items to be physically moved, as directed by the new higher scoring assignments.

The incremental reslotting process 700 begins at step 704 of FIG. 7A. At step 706, the process 700 is initialized for a full set of slots $S_1, S_2, \ldots, S_M$ organized, for example, in an existing sequence of slots, and specifies a threshold score T. At step 708, a set R is initialized to an empty set, the set R is a repository for items to be reassigned. At step 710, an index is set to one. At decision step 712, a determination is made whether slot $S_{index}$ has item $I_{index}$ assigned. If slot $S_{index}$ has an item assigned, the process 700 proceeds to step 714. If slot $S_{index}$ does not have an item assigned, the process 700 proceeds to connecting point 724. At step 714, a score X is computed for item $I_{index}$ and slot $S_{index}$. At decision step 716, a determination is made whether X is less than the pre-specified threshold T. If X is less than T, indicating the $I_{index}$ slot $S_{index}$ pair scored lower than threshold T, the process 700 proceeds to step 718. If X is greater than or equal to T, the process 700 proceeds to connecting point 724. At step 718, item $I_{index}$ is added to the set R which contains the set of items to be reassigned. At step 720, the assignment of $I_{index}$ to slot $S_{index}$ removed.

The process 700 then proceeds to connecting point 724 of FIG. 7B. At step 726, a one is added to the index. At decision step 728, a determination is made whether the index is less than or equal to N. If the index is less than or equal to N, the process 700 returns to decision step 712 in FIG. 7A. If the index is greater than N, the process 700 proceeds to step 730. At step 730, initialization where items $I_1, I_2, \ldots, I_M$ are M items assigned to set R. At step 732, the index is set to a one. At step 734, process 500 of FIG. 5 or process 600 of FIG. 6 is used to assign an item $I_{index}$ to a slot, if process 600 is used, one or more already occupied slots may be selected dependent upon their previously measured score which exceeds threshold T but are less than another threshold that is greater than T. In this manner, already occupied slots having thresholds greater than T but close to T may be considered for reassignment. At step 736, one is added to the index. At decision step 738, a determination is made whether the index is less than or equal to M. If the index is less than or equal to M, the process 700 returns to step 734. If the index is greater than M, the process 700 proceeds to step end point 740.

An important aspect of the scoring and reslotting processes is the ability to address degradation of warehouse operating efficiency that occurs over time as items are permanently removed from the warehouse and new items added. For example, by averaging composite scores for thousands of item and slot pairs in a warehouse, an overall score is obtained for the entire facility. Even if an initial score for the facility is high, over time, as discontinued items are permanently removed from the warehouse and new ones added, the organization of item and slot pairs may become degraded. By taking a snapshot of scores on a periodic basis, such as daily, weekly, or monthly, using processes 300 and 400, separately or combined, the amount of degradation can be quantified. Further, at some point the degradation can be expected to fall below a threshold score, where it is cost effective to perform a full or partial reorganization, or reslotting, of the warehouse. For example, the incremental reslotting process 700 of FIGS. 7A and 7B is a score based partial reslotting process that may be used to halt the degradation. Thus, a warehouse's overall score or scores of selected items may be used to quantify a degradation in efficiency over time and thus, may be used as a trigger for a reorganization effort.

The personal computer 112 of FIG. 1, for example, may be configured to execute a program stored on a computer readable storage medium either directly associated locally with the processor, such as may be available through a local storage medium or may be accessible through the Internet 106, for example, from a remote server system, such as remote server system 104, or over an intranet 110. The storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), jump drives, compact disk (CD), digital video disk (DVD), other types of removable disks, or any other suitable storage medium.

While the invention is disclosed in the context of illustrative embodiments for use in warehouses or distribution centers it will be recognized that a wide variety of implementations may be employed by persons of ordinary skill in the art consistent with the above discussion and the claims which follow below. In one example implementation, the various processes may be scripted into a general purpose calculation program, such as a spreadsheet program.

What is claimed is:

1. A computer based method for assigning an item to a slot in an item storage facility, the method comprising:

determining a plurality of scores utilizing a computer, each score associated with an item and slot pair, the slot chosen from a plurality of slots and each score representing a degree of conformity of the item to a desired sequence of item and slot pairs, wherein the degree of conformity is measured in a simulated pairing of the item with the slot chosen from the plurality of slots in a sequence of other item and slot pairs and a different slot is chosen from the plurality of slots for each simulated pairing with the item; and assigning the item to a best slot associated with a highest score among the plurality of scores utilizing the computer, wherein the plurality of slots includes a plurality of empty slots and already occupied slots that each has a low score.

2. The method of claim 1 wherein the plurality of slots are a plurality of empty slots.

3. A computer based method for assigning an item to a slot in an item storage facility, the method comprising:
   determining a plurality of scores utilizing a computer, each score associated with an item and slot pair, the slot chosen from a plurality of slots and each score representing a degree of conformity of the item to a desired sequence of item and slot pairs, wherein the degree of conformity is measured in a simulated pairing of the item with the slot chosen from the plurality of slots in a sequence of other item and slot pairs and a different slot is chosen from the plurality of slots for each simulated pairing with the item; and
   assigning the item to a best slot associated with a highest score among the plurality of scores utilizing the computer, wherein prior to determining a plurality of scores, each of the plurality of scores are initialized to an initialization value.

4. The method of claim 1 further comprising:
   adding a prespecified value to a score if the item paired with a slot and a predecessor item paired with a predecessor slot matches the corresponding item and slot pairs in the desired sequence of item and slot pairs; and
   adding the prespecified value to the score if the item paired with a slot and a successor item paired with a successor slot matches the corresponding item and slot pairs in the desired sequence of item and slot pairs.

5. The method of claim 4 further comprising:
   determining a predecessor slot does not exist; and
   adding the prespecified value to the score for the item.

6. The method of claim 4 further comprising:
   determining a predecessor slot is an empty slot and no further predecessor slots exist; and
   adding the prespecified value to the score for the item.

7. The method of claim 4 further comprising:
   determining a successor slot does not exist; and
   adding the prespecified value to the score for the item.

8. The method of claim 4 further comprising:
   determining a successor slot is an empty slot and no further successor slots exist; and
   adding the prespecified value to the score for the item.

9. The method of claim 1 further comprising:
   computing a plurality of separation distances with a computer, wherein each separation distance is the distance between the item and a unique slot in a group of slots; and
   setting a maximum proximity score equal to a prespecified value if each of the plurality of separation distances is less than or equal to a user specified maximum distance.

10. The method of claim 9 further comprising:
    setting a minimum proximity score equal to the prespecified value if each of the plurality of separation distances is greater than or equal to a user specified minimum distance.

11. A computer readable medium having embodied thereon a program for assigning an item to a slot in an item storage facility, the program being executable by a computer to perform the steps of:
    determining a plurality of scores, each score associated with an item and slot pair, the slot chosen from a plurality of slots and each score representing a degree of conformity of the item to a desired sequence of item and slot pairs, wherein the degree of conformity is measured in a simulated pairing of the item with the slot chosen from the plurality of slots in a sequence of other item and slot pairs and a different slot is chosen from the plurality of slots for each simulated pairing with the item;
    assigning the item to a best slot associated with a highest score among the plurality of scores;
    adding a prespecified value to a score if the item paired with a slot and a predecessor item paired with a predecessor slot matches the corresponding item and slot pairs in the desired sequence of item and slot pairs; and
    adding the prespecified value to the score if the item paired with a slot and a successor item paired with a successor slot matches the corresponding item and slot pairs in the desired sequence of item and slot pairs.

12. A computer readable medium having embodied thereon a program for assigning an item to a slot in an item storage facility, the program being executable by a computer to perform the steps of:
    determining a plurality of scores each score associated with an item and slot pair, the slot chosen from a plurality of slots and each score representing a degree of conformity of the item to a desired sequence of item and slot pairs, wherein the degree of conformity is measured in a simulated pairing of the item with the slot chosen from the plurality of slots in a sequence of other item and slot pairs and a different slot is chosen from the plurality of slots for each simulated pairing with the item;
    assigning the item to a best slot associated with a highest score among the plurality of scores; adding a prespecified value to a score if the item paired with a slot and a predecessor item paired with a predecessor slot matches the corresponding item and slot pairs in the desired sequence of item and slot pairs;
    adding the prespecified value to the score if the item paired with a slot and a successor item wired with a successor slot matches the corresponding item and slot pairs in the desired sequence of item and slot pairs;
    computing a plurality of separation distances, wherein each separation distance is the distance between the item and a unique slot in a group of slots; and
    setting a maximum proximity score equal to a prespecified value if each of the plurality of separation distances is less than or equal to a user specified maximum distance.

13. The computer readable medium of claim 12 further comprising:
    setting a minimum proximity score equal to the prespecified value if each of the plurality of separation distances is greater than or equal to a user specified minimum distance.

* * * * *